(12) United States Patent
Blair et al.

(10) Patent No.: US 7,273,570 B2
(45) Date of Patent: Sep. 25, 2007

(54) METHOD OF FORMING POLYMER PARTICLES

(75) Inventors: Stewart W. Blair, Rochester, NY (US); Lloyd A. Lobo, Rochester, NY (US); Tomas G. McHugh, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 146 days.

(21) Appl. No.: 11/178,091

(22) Filed: Jul. 8, 2005

(65) Prior Publication Data

US 2007/0007677 A1    Jan. 11, 2007

(51) Int. Cl.
    B29B 9/10    (2006.01)
(52) U.S. Cl. .......................................... 264/8
(58) Field of Classification Search .................. 264/8; 425/8
    See application file for complete search history.

(56) References Cited

U.S. PATENT DOCUMENTS

| | | | |
|---|---|---|---|
| 3,597,176 A * | 8/1971 | Plumat ........................ | 65/21.2 |
| 4,070,325 A | 1/1978 | Burke, Jr. | |
| 4,374,074 A * | 2/1983 | Ueda et al. ..................... | 264/8 |
| 4,833,060 A | 5/1989 | Nair et al. | |
| 6,380,297 B1 | 4/2002 | Zion et al. | |
| 6,515,153 B2 | 2/2003 | Burns et al. | |
| 6,858,189 B1 | 2/2005 | Ramshaw et al. | |
| 2002/0035281 A1 | 3/2002 | Burns et al. | |
| 2003/0161767 A1 | 8/2003 | Ramshaw et al. | |
| 2004/0235039 A1 | 11/2004 | Gray et al. | |
| 2004/0241430 A1 | 12/2004 | Jachuck et al. | |

FOREIGN PATENT DOCUMENTS

| | | |
|---|---|---|
| EP | 0 499 363 B1 | 8/1995 |
| EP | 1 152 832 B1 | 9/2002 |
| EP | 1 464 389 A1 | 10/2004 |
| EP | 6 169 125 B1 | 4/2005 |
| WO | 00/48728 | 8/2000 |
| WO | 02/18328 A1 | 3/2002 |
| WO | 03/008083 | 1/2003 |
| WO | 03/008460 | 1/2003 |

OTHER PUBLICATIONS

R.J.J. Jachuck et al., "Process Intensification: Removal of an Organic Component From an Aqueous Emulsion Using Spinning Dis Reactor Technology", Heat Recovery Systems and CHP, 1994, vol. 14, No. 5, pp. 475-491.

* cited by examiner

*Primary Examiner*—Mary Lynn Theisen
(74) *Attorney, Agent, or Firm*—Carl F. Ruoff

(57) ABSTRACT

The present invention is a method of manufacturing polymer particles. The method includes providing an oil in water emulsion, wherein the oil phase comprises a volatile solvent and at least one water insoluble polymer. The volatile solvent has a solubility of not more than 10% in water and the water insoluble polymer has a weight average molecular weight of at least 2000. The water insoluble polymer is soluble in the volatile solvent. The emulsion is supplied to a rotating surface of a rotating surface reactor. The temperature of the rotating surface is maintained at the boiling point of said solvent or greater. The rotating surface of the reactor spins at a speed sufficient to cause the emulsion to spread over the rotating surface as a continuously flowing thin film wherein a vapor phase containing the volatile solvent is removed. The water insoluble polymer particles are then collected as a slurry of polymer particles and water.

15 Claims, 1 Drawing Sheet

METHOD OF FORMING POLYMER PARTICLES

FIELD OF THE INVENTION

The present invention describes a novel method of removing solvent from polymer particles in a water-solvent emulsion.

BACKGROUND OF THE INVENTION

Polymer particles of controlled sizes are desirable in a wide variety of applications. In the imaging industry, they can be used to prepare beads that incorporated in the top most layer of the imaging element. The size of these beads determines the gloss imparted to the image. They can also be used in ink formulations, particularly aqueous, where upon drying they form a film to encapsulate the pigments or dyes. In electrophotography, polymeric particles containing pigments are used as toners or dry inks. While it is well known in the art to prepare vinyl or addition type polymer particles of varying sizes by emulsion or suspension polymerization techniques, it is much more difficult to prepare particles comprising condensation type polymers. Even in the case of vinyl polymers, it is not easy to prepare particles where there are mixtures of more than one polymer. Typically, in these instances insitu polymerization techniques such as those mentioned above will result in copolymers being formed rather than physical mixtures of polymers.

In these instances an emulsion technique can be used, wherein an organic phase comprising the desired mixture of polymers is dissolved in a suitable volatile solvent, which is then emulsified with an aqueous medium containing appropriate stabilizers to form an oil-in-water type of emulsion. The solvent is then removed from the oil-in-water emulsion by evaporation resulting in a product comprising an aqueous slurry of polymer particles in an aqueous medium. The evaporative method of making polymer particles is more versatile than the insitu polymerization techniques, because of the reasons mentioned above.

The method of removing the solvent from the oil in water emulsion is one major factor in the cost of producing the polymer particles. This is particularly important for cost sensitive products such as toners for electrophotographic printing and matting agents. Most of the methods described in the prior art relate to batch processes. U.S. Pat. No. 4,833,060 describes using a Nitrogen stream passing through the vapor space above a stirred emulsion, thereby carrying away vapors of the solvent. This method can increase the cost of the process not only because of the time involved, but because of the cost of the nitrogen that is used. Nitrogen is desired from a safety point of view, because of the flammability of most practical types of volatile solvent. Furthermore, the cost of recovering the solvent vapors in a diluted stream is also high—solvent recovery is desirable from both a solvent cost as well as an environmental point of view. U.S. Pat. No. 6,380,297 describes a vacuum evaporation method, where the lower pressure enables the removal of solvent at a lower temperature. While this method has the potential for lower cost than the nitrogen sweep method, it also has its problems. The time required to remove the solvent from the emulsion increases in proportion to the size of the batch. This can create a bottleneck in the manufacturing process, thereby increasing the size of the equipment that need to be used. Additionally, the longer time required by the emulsion to remain at an elevated temperature, contributes to coalescence occurring in the emulsion and change in the particle size distribution of the process. Thus, it is desirable to remove the solvent from the process in a continuous manner.

U.S. Pat. No. 5,580,692 discloses the use of water to extract the solvent from the emulsion. This technique can be used when the volatile solvent has some miscibility in water. However, the amount of water required to extract the solvent is large and subsequent recovery of the solvent from the water-solvent mixture can be quite difficult.

There are several processes known to those skilled in the art to continuously evaporate a solvent from a fluid or suspension. Flash evaporators remove the solvent by raising the temperature of a fluid to a desired temperature and then flashing it into a low pressure environment, such that the fluid temperature is substantially higher than the boiling point of the solvent at the lowered temperature. Thus, the solvent is separated under adiabatic conditions—no heat is provided during the boiling stage. While this method can achieve continuous removal of solvent in a relatively short period of time, the ability to decrease the residual solvent in the polymer particles to a desired low level becomes increasingly difficult as the solvent level in the initial emulsion becomes higher. This is because under adiabatic conditions, the higher the amount of solvent removed the greater is the degree of cooling, from the latent heat of vaporization and eventually at a high solvent level, the product will cool to below the boiling point of the solvent, resulting in high residual levels of solvent in the product.

Another continuous method is the falling film evaporation, where the emulsion falls down the side of a tube of a heat exchanger to which heat is provided on the other side of the tube by a heating fluid. U.S. Pat. No. 4,833,060 discloses the use of a falling film evaporator to remove the solvent from the emulsion. The process can also be carried out under reduced pressure, just as the flash evaporation method was carried out. In this instance, the solvent removal occurs under isothermal conditions, and thus solvent levels in the emulsion are not restricted. However, the heat transfer needed to provide boiling is dependent on the thickness of the film, which in turn is determined by the gravity force. Thus, this process is not flexible in controlling the heat transfer coefficient, and subsequently results in relatively large equipment size.

Among all previous mentioned methods of solvent removal the falling film evaporator is the most amenable to the removal of solvent for this application. However it is desirable to control the film thickness to optimize the heat transfer rates in order to achieve the desired product characteristics with the smallest equipment possible. The spinning disc reactor is an attempt to apply the principles of process intensification to the fields of heat and mass transfer. This type of reactor includes within a chamber a plate like member or an assembly of a plurality of such members which is rotated about its central axis, usually a vertical axis but a horizontal axis or any other orientation is not excluded, to effect transfer of a liquid material from the central axis radially outward under the influence of centrifugal force and in the form of thin often wavy films across the plate or plates. Such thin films have been shown to significantly improve the heat and mass transfer rates and mixing. The technology was developed for various common heat and mass transfer and mixing applications such as disclosed in R J J Jachuck and C Ramshaw, "Process Intensification: Heat transfer characteristics of tailored rotating surfaces", Heat Recovery Systems and CHP, Vol. 14, No 5, pp. 475-491, 1994. The properties of these thin often wavy films can be manipulated by changing the disc rotational speed, the throughput of the materials fed to the disc, the temperature of the disc and the configuration of the disc surface.

EP 0499 363 describes the utilization of a spinning disc reactor for the photo-catalytic degradation of organic materials.

EP 1152 823 describes the utilization of a spinning disc for polymerization of ethylene on a catalyst coated disc, precipitation of barium sulphate crystals and precipitation of calcium carbonate crystals.

US Publication 2004/0235039 describes the utilization of a spinning disc reactor for the free radical polymerization of styrene and the cationic polymerization of styrene.

WO2003/008460 A1 further describes methods of polymerizing chemical components using a spinning disc reactor.

US Publication 2004/0241430 and WO 2003/008 083, further describe the utilization of a spinning disc reactor for the precipitation of small particles.

WO 0004/8728A1 describes the benefits of spinning disc reactors with enhanced surface features, seemingly similar to EP 1169 125 B1 which describes a "rotating surface of revolution reactor with shearing mechanisms.

U.S. Pat. No. 6,515,153 and US 2002/0035281A1 describe the utilization of a spinning disc reactor for the forming of amido esters.

W0021 8328 A1 describes the utilization of a spinning disc reactor for reacting carboxylic acids and esters.

EP 146 4389 describes an embodiment of a spinning disc which includes a rotary fan or impeller to remove a gaseous component from a region surrounding the periphery of the surface.

U.S. Pat. No. 6,858,189 B1 and US Publication 2003/0161767 A1 describe various feeding and collection mechanisms suitable for a spinning disc reactor.

The spinning disc has attractive properties beneficial in the current invention including intense mixing in the thin liquid film, short residence times, plugflow characteristics, easy cleaning, high solid/liquid heat/mass transfer rates, high liquid/vapor heat/mass transfer and high energy efficiency.

The prior art does not teach the removal of solvents utilizing a spinning disc reactor and furthermore does not teach the removal of solvents from within particles dispersed in an aqueous medium.

SUMMARY OF THE INVENTION

It is desirable to remove solvent from an oil in water emulsion, in a continuous manner, the method of removal should be flexible to varying levels of solvent in the emulsion, and that the equipment be small and easily scalable. This purpose also needs to be accomplished without the use of excessively high temperatures which may have adverse effects on the product. These and other objectives can be accomplished by
 1. feeding the emulsion on to a rotating disc, whose speed of rotation can be controlled
 2. heating the disc to above the boiling point of the solvent
 3. removing the vapors from head space above the fluid from the disc
 4. collecting the slurry of polymer particle devoid of substantial quantities of solvent

DETAILED DESCRIPTION OF THE INVENTION

Figure 1:
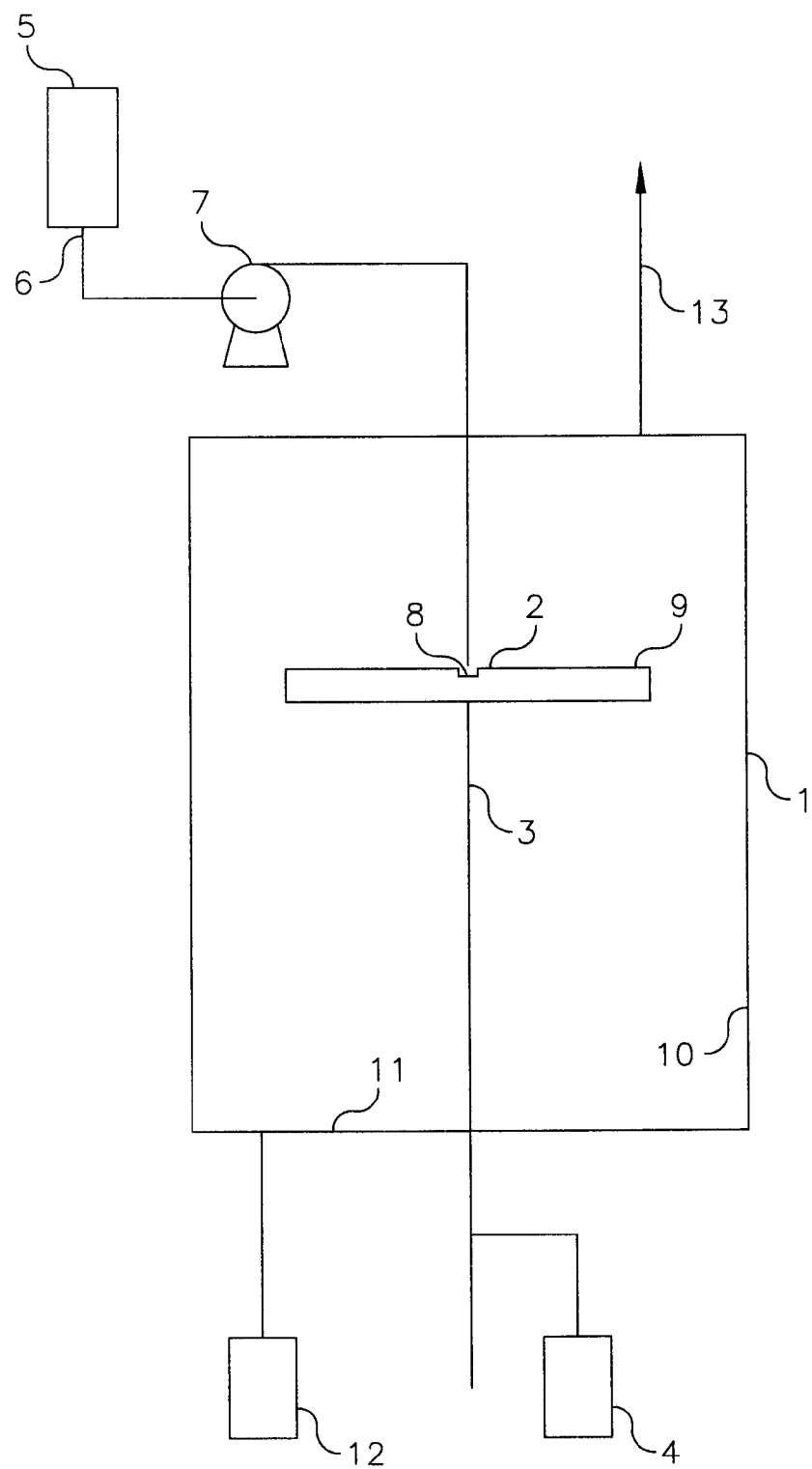
FIG. 1 shows a schematic diagram of a spinning disc reactor used in the examples.

The oil-in-water emulsion can be prepared in the following manner:

All the components desired in the final particle are added to the solvent in the desired ratio. These components may include at least one polymer whose weight average molecular weight is at least 2000 daltons. The oil phase can also comprise other functional materials desired. In the case of electro photographic toners, this can include oleophilic dyes, dispersions of pigments, iron oxide and waxes. U.S. Pat. Nos. 6,824,945, 6,682,866 and Publication 2004/0076899 disclose methods to disperse pigments and waxes within the solvent phase by using media milling techniques. Dispersants that are used to stabilize the wax and pigment particles in the solvent phase can be the at least one polymer, or any other polymer or low MW dispersants. Any such dispersants will also be incorporated within the polymer particles U.S. Pat. No. 5,283,150 disperses the pigment and wax by first melt compounding them at elevated temperatures. While it is desirable that wholly formed polymers are incorporated in the solvent phase, it is also possible to use oligomers and pre-polymers. Subsequent to forming the oil-in-water emulsion these prepolymers can be reacted. U.S. Pat. Nos. 6,740,460 and 6,660,443 and other patents referenced therein disclose the use of polyester prepolymers with isocyanate terminal groups which are then reacted after the oil-in-water emulsion is formed. Such preparation methods can provide for a core-shell type of particle.

The solvent concentration in the solvent phase is governed by many factors. Depending on the MW of the polymer, low levels of solvent result in very high viscosity of the solvent phase, making it difficult to disperse in the emulsification step. Thus, it is desirable that the viscosity of the solvent phase not exceed 5000 cp at the temperature of emulsification. As second factor that dictates the solvent level is the capability to remove the solvent in a reasonable amount of time. The invention of the current specification removes this criteria because of its superior ability to provide heat to the evaporating fluid, commensurate with high heat transfer coefficients.

The solvent phase is then added to an aqueous phase, upon which agitation is used to prepare an oil-in-water emulsion. Several agitation techniques disclosed in U.S. Pat. Nos. 6,682,866 and 4,833,060 may be used to prepare these emulsions. In addition to these techniques any other homogenization techniques know to those skilled in the art may be used.

In order to stabilize the oil-in-water emulsion prior to solvent removal, stabilizers may be included in the aqueous phase. These stabilizers may include water soluble low molecular weight surfactants—anionic, cationic, zwitterionic or nonionic. Examples of such surfactants are disclosed in US application 20040142265 A1 are alkylbenzene sulfonates, α-olefin sulfonates, phosphoric esters, and other anionic surfactants; alkylamine salts, amino alcohol fatty acid derivatives, polyamine fatty acid derivatives, imidazoline, and other amine salts cationic surfactants, alkyltrimethylammonium salts, dialkyldimethylammonium salts, alkyldimethylbenzylammonium salts, pyridinium salts, alkylisoquinolinum salts, benzethonium chloride, other quaternary ammonium salts cationic surfactants, and other cationic surfactants; fatty acid amide derivatives, polyhydric alcohol derivatives, and other nonionic surfactants; alanine, dodecyl di(aminoethyl)glycine, di(octylaminoethyl)glycine, N-alkyl-N,N-dimethylammonium betaines, and other amphoteric surfactants.

The effects of the surfactants can be obtained in a small amount by using a surfactant having a fluoroalkyl group. Preferred examples of fluoroalkyl-containing anionic surfactants are fluoroalkylcarboxylic acids each containing 2 to 10 carbon atoms, and metallic salts thereof, disodium perfluorooctanesulfonyl glutamate, sodium 3-[omega-fluoroalkyl ($C_6$-$C_{11}$) oxy]-1-alkyl ($C_3$-$C_4$) sulfonate, sodium 3-[omega-fluoroalkanoyl ($C_6$-$C_8$)—N-ethylamino]-1-propanesulfonate, fluoroalkyl ($C_{11}$-$C_{20}$) carboxylic acids and metallic salts thereof, perfluoroalkyl carboxylic acids ($C_7$-$C_{13}$) and metallic salts thereof, perfluoroalkyl ($C_4$-$C_{12}$) sulfonic acids and metallic salts thereof, perfluorooctanesulfonic acid diethanolamide, N-propyl-N-(2-hydroxyethyl) perfluorooctanesulfonamide, perfluoroalkyl ($C_6$-$C_{10}$) sulfonamide propyl trimethyl ammonium salts, perfluoroalkyl ($C_6$-$C_{10}$)—N-ethylsulfonyl glycine salts, and monoperfluoroaklyl ($C_6$-$C_{16}$) ethyl phosphoric esters.

Oligomeric or polymeric stabilizers including gelatin, polysaccharides, synthetic polymers such as maleic anhydride containing polymers, condensation polymers may be used. U.S. Pat. No. 5,620,826 discloses the use of water soluble polymers containing ionic entities as stabilizer to make electrophotographic toners. Other examples of the polymeric protective colloid include homopolymers and copolymers of acids such as acrylic acid, methacrylic acid, α-cyanoacrylic acid, α-cyanomethacrylic acid, itaconic acid, crotonic acid, fumaric acid, maleic acid, and maleic anhydride; hydroxyl-group-containing (meth)acrylic monomers such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylic ester, diethylene glycol monomethacrylic ester, glycerol monoacrylic ester, glycerol monomethacrylic ester, N-methylolacrylamide, and N-methylolmethacrylamide; vinyl alcohol and ethers thereof such as vinyl methyl ether, vinyl ethyl ether, and vinyl propyl ether; esters of vinyl alcohol and a carboxyl-group-containing compound, such as vinyl acetate, vinyl propionate, and vinyl butyrate; acrylamide, methacrylamide, diacetone acrylamide, and methylol compounds thereof; acid chlorides such as acryloyl chloride, and methacryloyl chloride; nitrogen atom such as vinylpyridine, vinylpyrrolidone, vinylimidazole, and ethyleneimine; polyoxyethylene compounds such as polyoxyethylene, polyoxypropylene, polyoxyethylene alkyl amines, polyoxypropylene alkyl amines, polyoxyethylene alkyl amides, polyoxypropylene alkyl amides, polyoxyethylene nonyl phenyl ether, polyoxyethylene lauryl phenyl ether, polyoxyethylene stearyl phenyl ester, and polyoxyethylene nonyl phenyl ester; and cellulose derivatives such as methyl cellulose, hydroxyethyl cellulose, and hydroxypropyl cellulose. Solid stabilizers such as hydroxyapatite, as disclosed in U.S. Pat. No. 6,660,443 (and other related patents) may also be used.

A special case of solid stabilizers that are used in the 'limited coalescence' process are particularly desirable for producing toner particles for the electrophotography. U.S. Pat. Nos. 4,833,060 and 4,835,084 disclose the use of colloidal silica to prepare limited coalescence emulsions, while U.S. Pat. Nos. 4,965,131 and 5,133,992 disclose the use of latex particles to provide monodisperse limited coalescence emulsions. Also the size and quantity of the solid dispersing agent depends upon the size of the particles of the solid dispersing agent and also upon the size of the toner particles desired. Thus, as the size of the polymer/solvent droplets are made smaller by the high shear agitation, the quantity of the dispersing agent varies in order to prevent the uncontrolled coalescence of the particles and in order to achieve uniform size and size distribution in the particles that result.

The ratio of the solvent phase to the aqueous phase is dictated by the ability to emulsify the solvent phase. From a manufacturing economics perspective it is desirable to maximize the ratio of solvent phase to aqueous phase. However, if the ratio is too high phase inversion may occur creating a water-in-oil emulsion. Thus, it is preferred that the volume of oil phase be at least 10% of the emulsion but not greater than 75%.

Thus, the total solvent level in the emulsion can be anywhere from 0.5% to 75% by weight.

Particles prepared by evaporating solvent from emulsions are inherently spherical. However, in some applications, specifically for electrophotographic toners, non-spherical or irregular particles are desired. In this case a shape control agent" can be added in the aqueous phase or oil phase. U.S. Pat. Nos. 5,283,151, 5,968,702, 6,380,297, 6,294,595 disclose various chemistries to alter the shape of the polymer particles subsequent to evaporation.

The final particle size of the solvent free polymer particles depends on all the formulation factors described above, i.e., solvent level in the solvent phase, solvent phase to aqueous phase ratio, dispersant level. Depending on the applications the final particle size in the product can be from 5 nm to 1 mm in size. For electrophotographic toner applications, the particle size range is from 3 μm to 25 μm.

For imaging applications colorants can be added to the polymer particles.

Any conventional or known dyes and pigments can be used as the colorant of the present invention. Such dyes and pigments include, but are not limited to, carbon black, nigrosine dyes, black iron oxide, Naphthol Yellow S, Hansa Yellow (10G, 5G, and G), cadmium yellow, yellow iron oxide, yellow ochre, chrome yellow, Titan Yellow, Polyazo Yellow, Oil Yellow, Hansa Yellow (GR, A, RN, and R), Pigment Yellow L, Benzidine Yellow (G, GR), Permanent Yellow (NCG), Vulcan Fast Yellow (5G, R), Tartrazine Lake, Quinoline Yellow Lake, Anthragen Yellow BGL, isoindolinone yellow, red oxide, red lead oxide, red lead, cadmium red, cadmium mercury red, antimony red, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, eosine lake, Rhodamine Lake B, Rhodamine Lake Y, Alizarine Lake, Thioindigo Red B, Thioindigo Maroon, Oil Red, quinacridone red, Pyrazolone Red, Polyazo Red, Chrome Vermilion, Benzidine Orange, Perynone Orange, Oil Orange, cobalt blue, cerulean blue, Alkali Blue Lake, Peacock Blue Lake, Victoria Blue Lake, metal-free phthalocyanine blue, Phthalocyanine Blue, Fast Sky Blue, Indanthrene Blue (RS, BC), indigo, ultramarine, Prussian blue, Anthraquinone Blue, Fast Violet B, Methyl Violet Lake, cobalt violet, manganese violet, dioxazine violet, Anthraquinone Violet, chrome green, zinc green, chromium oxide, viridian emerald green, Pigment Green B, Naphthol Green B, Green Gold, Acid Green Lake, Malachite Green Lake, Phthalocyanine Green, Anthraquinone Green, titanium oxide, zinc white, and lithopone, and mixtures thereof. The content of the colorant is generally from 1% by weight to 15% by weight, and preferably from 3% by weight to 10% by weight of the toner.

Waxes that can be incorporated with the polymer particles are useful for imaging applications such as abrasion resistance and blocking. For electrophotographic applications an additional purpose of the wax is to aid in the detachment of the toner from the fuser roller during the fusing step and avoid the use of conventional release agents such as silicone oil.

The wax is preferably present in an amount of from about 0.1 to about 20 wt % and more preferably in an amount of from about 0.5 to about 15 wt % based on the toner weight. Examples of suitable waxes include, but are not limited to, polyolefin waxes, such as low molecular weight polyethylene, polypropylene, copolymers thereof and mixtures thereof. In more detail, more specific examples are copolymers of ethylene and propylene preferably having a molecular weight of from about 1000 to about 5000 g/mole, particularly a copolymer of ethylene and propylene having a molecular weight of about 1200 g/mole. Additional examples include synthetic low molecular weight polypropylene waxes preferably having a molecular weight from about 3,000 to about 15,000 g/mole, such as a polypropylene wax having a molecular weight of about 4000 g/mole. Other suitable waxes are synthetic polyethylene waxes. Suitable waxes are waxes available from Mitsui Petrochemical, Baker Petrolite, such as Polywax 2000, Polywax 3000, and/or Unicid 700; and waxes from Sanyo Chemical Industries such as Viscol 550P and/or Viscol 660P. Other examples of suitable waxes include waxes such as Licowax PE130 from Clarient Corporation. Other desirable waxes include Carnauba wax, rice wax and other ester waxes including those of montanic acid.

As indicated above, the invention is applicable to the preparation of polymeric particles from any type of polymer that is capable of being dissolved in a solvent that is immiscible with water and includes such as, for example, olefin homopolymers and copolymers, such as polyethylene, polypropylene, polyisobutylene, and polyisopentylene; polyfluoroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polymethylacrylate, polyethylmethacrylate, and styrene-methylmethacrylate; ethylene-methyl acrylate copolymers, ethylene-ethyl acrylate copolymers, ethylene-ethyl methacrylate copolymers, polystyrene and copolymers of styrene thereof with unsaturataed monomers mentioned above, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyral, polyvinyl acetal, ethylene-vinyl acetate copolymers, ethylene-vinyl alcohol copolymers, and ethylene-allyl copolymers, such as ethylene-allyl alcohol copolymers, ethylene-allyl acetate copolymers, ethylene-allyl acetone copolymers, ethylene-allyl benzene copolymers ethylene-allyl ether copolymers, and ethylene-acrylic copolymers; and polyoxymethylene, polycondensation polymers, such as, polyesters, polyurethanes, polyamides, polycarbonates and the like. Most of the above mentioned polymers are particularly useful for electrophotographic toner applications. Any suitable solvent that will dissolve the polymer and which is also immiscible with water may be used in the practice of this invention such as for example, chloromethane, dichloromethane, ethyl acetate, propyl acetate, vinyl chloride, MEK, trichloromethane, carbon tetrachloride, ethylene chloride, trichloroethane, toluene, xylene, cyclohexanone, 2-nitropropane and the like. A particularly useful solvent in the practice of this invention is ethyl acetate for the reason that it is both a good solvent for many polymers while at the same time it is immiscible with water. Further, its volatility is such that it is readily removed from the discontinuous phase droplets by evaporation. While the solvent should be substantially immiscible a small level of solubility in the aqueous phase is desirable for fast kinetics of solvent removal. If the solubility is too high there is a chance of the polymer precipitating out when the solvent phase is combined with the water phase. Thus the preferred solvent should have a solubility of not greater than 10% in water.

Various additives generally present in electrostatograhic toner may be added to the polymer prior to dissolution in the solvent or in the dissolution step itself, such as charge control agents, waxes and lubricants. Suitable charge control agents are disclosed, for example, in U.S. Pat. Nos. 3,893, 935 and 4,323,634 to Jadwin et al. and U.S. Pat. No. 4,079,014 to Burness et al.; and British Patent No. 1,420,839 to Eastman Kodak. Charge control agents are generally employed in small quantities such as from about 0 to 10 parts per hundred based upon the weight of the total solids content (weight of the toner) and preferably from about 0.2 to about 3.0 parts per hundred. (See U.S. Pat. No. 6,380,297) Particles having an average size of from 0.05 µm to 100 µm and preferably from 0.1 µm to 60 µm may be prepared in accordance with this invention.

The present invention relates to the use of a spinning disc reactor. The reactor itself may be configured in any manner which is convenient to the formulator, however, each of the one or more discs or plates rotate about an axis. The plates themselves are enclosed within a container suitable for carrying out the herein described operations.

Non-limiting examples of spinning disc reactors are disclosed in "Process Intensification: The opportunity presented by spinning disk reactor technology;" Inst. of Chem. Eng. Symp. Ser. 1997; R. Jachuck, C. Ramshaw, K. Boodhoo, and J Dalgleish, 141, 417-424; "Photo-initiated polymerisation using spinning disc reactor," Jachuck, R. J. and Ramshaw, C., Third International Conference on PI, Antwerp 25-27 Oct. 1999; and "Process Intensification: spinning disc polymeriser," IchemE Research Event—First European Conference for Young Researchers in Chemical Engineering.

The current invention is concerned with utilizing the high heat and mass transfer and mixing rates in the thin films generated by a spinning disc reactor to remove organic solvent from an oil in water emulsion to produce polymer particles. In order to do this the spinning disc is modified so as to provide heat to the thin film present on the rotating disc. The main modification to this is that the disc has to be heated to above the boiling point of the solvent. In addition, solvent removal can be enhanced by reduction in the pressure in the chamber that houses the spinning disc.

As mentioned previously the thickness of the film can be controlled by the speed of rotation of the disc. US Publication 2004/0241430 A1 and U.S. Pat. No. 6,482,960 describe the equations that can be used to calculate the film thickness and residence time of the fluid on the rotating disc.

The film thickness on the rotating disc is given by the equation $$\delta = \left(\frac{3}{2\pi}\frac{vQ}{\omega^2 r^2}\right)^{\frac{1}{3}}$$

The residence time of the fluid on the rotating disc is given by $$t_{res} = \left(\frac{81\pi^2 v}{16\omega^2 Q^2}\right)^{\frac{1}{3}}(r_0^{\frac{4}{3}} - r_i^{\frac{4}{3}})$$

where
δ=film thickness
ω=angular velocity of rotation
Q=volumetric flow rate
v=kinematic viscosity
r=radial position on the disc with the center of the disc having a value of 0
$r_o$=Outer radius of disc
$r_i$=radius on disc at which the fluid is introduced Since the heat transfer coefficient in a thin film is inversely proportional to the film thickness, it is beneficial to use the conditions where the film thickness does not exceed 500 μm. It is preferred that the film thickness not exceed 25 μm. In order to maximize throughput and minimize the reactor size, it is desired that the residence time not exceed 1 s and preferably not exceed 0.6 s. The speed of rotation of the disc and the rate at which the emulsion is introduced onto the disc can be modified by the formulator to meet the requirements of the process. For example, depending upon the time necessary for the solvent removal to be complete, the viscosity of the emulsion, the rotational velocity can be adjusted to shorten or lengthen the residence time of the reactants on each plate. Generally the rotational speed of the disc is between 100-5000 rpm, and preferably between 500-3000 rpm. Depending upon the size of the rotating discs and the rotational velocity, residence times are generally from 0.01 seconds to 5 seconds.

The rotational velocity of the disc can also be used to vary the emulsion film thickness on the disc thereby influencing the heat and mass transfer rates and mixing. Thus the disc diameter, rotational velocity and the feed rate can be manipulated to optimize the removal of solvent.

The temperature of the fluid imparted by the disc is important to the solvent removal rates and typically has to be above the boiling point of the solvent.

The temperature of the disc can be varied via many methods such as the utilization of a heat transfer fluid, an electrical heat source either embedded in the disc surface or close to the disc surface, a radiant heat source or a high powered laser. In order to reduce the heat load of the spinning disc reactor the feed emulsion can be pre-heated.

The process of the present invention can be conducted at any temperature within the operable limits of the spinning disc reactor. Thus it can be summarized that the thin films generated by the high rotational speeds in a spinning disc reactor are beneficial for many chemical reactions and transformations, with the current invention utilizing them for the purposes of removing an organic solvent from an oil/water emulsion for the purposes of manufacturing polymer particles.

EXAMPLE 1

FIG. 1 is one form of the reactor which includes a chamber 1 having mounted horizontally therein a rotatable disc 2 on a shaft 3 coupled to a motor 4. A storage tank 5 has an outlet 6 in the base of the tank through which the contents of the tank can be transferred through a pump 7 to a countersunk annular trough 8. Rotation of the disc causes the dispersion to flow radially outward in the form of a thin film in contact with the disc surface 9 until the edge of the disc is reached and the dispersion ceases contact with the disc and is thrown against the heated inner chamber wall 10 which the dispersion then flows down into the base of the chamber 11 and then to an appropriate collection vessel 12.

5300 g of Kao Tuftone NE 303 which is bis-phenol A type polyester is dissolved in 21200 g ethyl acetate to form an organic phase. This is mixed in a high shear mixer with and aqueous phase containing 50413.6 g water, 2120 g Nalco 1060 colloidal silica, 466.4 g of 10% poly(adipic acid-co-methylaminoethanol) solution and 308.5 g potassium hydrogen phthalate before being passed through a microfluidizer with a 5000 psi pressure drop to form an emulsion. The % of ethyl acetate in the emulsion was 26%.

A 3 liter vessel is used as the feed tank. The feed is pumped onto the center of a 300 mm diameter smooth copper disk via stainless steel feed lines using a calibrated peristaltic pump. The disk rotational rate was set using a phase inverter to control the power going to the disk motor. The heat transfer fluid was supplied from a 9 kW Neslab water bath which is capable of delivering 24 liters per minute with a pressure of 400 kPa. A fraction of the heat transfer fluid was used to heat the enclosure wall to prevent any condensation occurring there. A plate heat exchanger was adapted and used as the condenser to recover the volatile phase after the volatile phase exited the spinning disc containing chamber via two approximately 2" diameter pipes. Iced water was used as the coolant and a centrifugal pump, operating with a flowrate of 12 liters per minute used to circulate this fluid. A rotary vane vacuum pump was used to provide vacuum, the vacuum level achieved being measured with a vacuum gauge. The chamber that houses the spinning disc is evacuated to an absolute pressure of 4" Hg to aid the solvent removal.

The emulsion was pumped at a flow rate of 40 ml/s. The temperature of the heating fluid to the disc was set at 55 C. The vacuum was set at an absolute pressure of 4" Hg. During the actual operation, the absolute pressure increased to 6" Hg. The process was run for about half a minute after which the process was stopped and the product collected. Based on the equations described above, the film thickness on the disc under these operating conditions is calculated to be 38 μm and the residence time is 0.27 s.

The residual organic component in the product was quantified using a HP 5890 series II gas chromatograph equipped with a F.I.D. A 30 m long, 0.32 mm ID with 1 micron coating of 5% (diphenyl)dimethylpolysiloxane capillary column was found to provide suitable separation of the residual components. One weight percent of acetone was added to the product to act as internal standard. A 20:1 injector split was used to ensure good peak resolution and shape. The system was calibrated using predetermined calibration mixtures and a linear response to residual organic component found. The residual solvent level was 0.68%.

The polymer particles were analysed for particle size distribution using a Coulter multisizer 2. The mean particle size and the poly-dispersity were compared to a similar product where the solvent removal was accompanied by nitrogen in the form of a nitrogen sweep overnight. The results showed that the particles size distribution was indentical in the two cases showing that the process did not effect the desired particle size.

COMPARATIVE EXAMPLE 1

5 gallons of the previously described emulsion was put into a 45 gallon jacketed reactor with a paddle stirrer. The jacket temperature was set to 55 C and the pressure in the tank was set to 150 mm Hg. The evaporation was carried out for 3 hours with stirring, before the residual ethyl acetate in the emulsion was below 1% by weight.

Thus it is clear that while the productivity is substantially increased compared to the baseline method while the product quality is not affected. The comparative example which uses the conventional batch evaporator does an adequate job of removing the solvent. However, the heat transfer rates are substantially slower than that obtained with the spinning disc reactor. The rate of dispersion that this conventional method can process is about 1.76 ml/s (5 gallons over 3 hours), compared to the Spinning Disc instantaneous rate of over 40 ml/s. The spinning disc reactor has the further advantage over the batch reactor of being easily scalable. This advantage is manifest in two ways 1) the thin film on the reactor is predictable and easily controllable, thus calculations for larger devices can be carried out with relative certainty and ease and 2) the production rates of the spinning disc mean that the so called "lab scale" device has utility for larger scale manufacturing. Furthermore, the device is small enough that several identical devices could be provided either as separate units or preferably as the multi-disc embodiment previously mentioned for less cost, space and risk than scaling up conventional apparatus. Furthermore, for a product, such as electrophotographic toner, it allows for the evaporation step to proceed continuously, thereby eliminating the need to have holding tanks prior to the evaporation step. A further benefit of the invention over the conventional method is that because boiling in the batch reactor occurs over a period of hours, it facilitates the build up of foam. This results in a requirement that the batch reactor have a substantial headspace above the boiling fluid. In the case of the spinning disc reactor, the evaporation is almost instantaneous and, thus, the size of the equipment required is much smaller and no foaming problems were observed.

EXAMPLE 2

An oil-in-water emulsion of the same composition as described in Example 1 was used as the feed to the spinning disc reactor. The feed was run at two different conditions shown in Table below. The product from the reactor was collected and measured for residual ethyl acetate and particle size distribution in the method described in Example 1. In each case a small sample of the emulsion was collected prior to feeding the reactor and the solvent was stripped from the sample in a laboratory rotoevaporator. The particle size of the lab sample was used as a comparison with the product from the reactor.

In the above example the temperature of the disc and the vacuum setting for the two samples were very similar. However, the residual ethyl acetate is lower at the higher flow rate and this is accomplished by increasing the rotational speed of the disc. Moreover, the particle size from the lab sample and the product are quite similar for each run, demonstrating the ability of the reactor to maintain the desired particle size even with the flow conditions within the reactor. The results above show that the ability to control the residual solvent level can be achieved by varying the rotational speed and thus, the film thickness. Thus, one equipment can be used to process different feed compositions, within very few process constraints.

The invention has been described in detail with particular reference to certain preferred embodiments thereof, but it will be understood that variations and modifications can be effected within the spirit and scope of the invention.

It is claimed:

1. A method of manufacturing polymer particles comprising:
   i) providing an oil in water emulsion, wherein the oil phase comprises a volatile solvent, at least one water insoluble polymer wherein the volatile solvent has a solubility of not more than 10% in water and the water insoluble polymer has a weight average molecular weight of at least 2000, said water insoluble polymer being soluble in the volatile solvent;
   ii) supplying the emulsion to a rotating surface of a rotating surface reactor;
   iii) maintaining the temperature of the rotating surface at a boiling point of said solvent or greater;
   iv) operating the rotating surface reactor so that the rotating surface spins at a speed sufficient to cause the emulsion to spread over the rotating surface as a continuously flowing thin film wherein a vapor phase containing the volatile solvent is removed; and
   v) collecting the water insoluble polymer particles as a slurry of polymer particles.

2. The method of claim 1 wherein the spinning disc reactor is operated at a pressure of from 0 to 30 inches of Hg vacuum.

3. The method of claim 1 wherein emulsion is preheated prior to contacting the disc.

4. The method of claim 1 wherein the volatile solvent in the emulsion is from 1 to 50% by weight.

5. The method of claim 1 wherein the dissolved polymer concentration in the oil phase is from 1 to 60% by weight.

6. The method of claim 1 wherein a ratio of volatile solvent to water is from 0.1 to 50% by volume.

7. The method of claim 1 where the slurry of polymer particles has less than 5% by weight of the volatile solvent.

8. The method of claim 1 where the volatile solvent is less than 1% by weight of the final slurry.

| Run | Disp Rate Gm/s | Start Disc Vac In. Hg | Disc Temp In C. | Disc Temp Out C. | Disc RPM | EK GC results (mixture) % | median particle size from product micron | median particle sizer from rotoevaporator micron |
|---|---|---|---|---|---|---|---|---|
| 1 | 25 | 28 | 56.8 | 55.8 | 800 | 2.82 | 7.33 | 7.31 |
| 2 | 35 | 28.5 | 56.7 | 51.3 | 1200 | 1.87 | 7.84 | 7.99 |

9. The method of claim 1 where the slurry of polymer particles further comprises polymeric binders, pigments, waxes or charge control agents.

10. The method as in claim 1 where the vapor phase is collected and condensed.

11. The method as in claim 1 wherein the slurry contains polymer particles having a particle size of from 0.05 μm to 100 μm.

12. The method as in claim 1 wherein the emulsion contains stabilizers or surfactants.

13. The method as in claim 1 wherein the rotating surface is at a speed of between 100 and 5000 rpm.

14. The method as in claim 1 wherein the emulsion has a residence time on the rotating surface of from 0.1 to 5 seconds.

15. The method as in claim 1 wherein the emulsion has a thickness on the rotating surface of less than 500 μm.

* * * * *